(12) United States Patent
Shimada et al.

(10) Patent No.: US 10,037,011 B2
(45) Date of Patent: Jul. 31, 2018

(54) TIME MEASURING CIRCUIT AND TEMPERATURE SENSOR CIRCUIT

(71) Applicant: KABUSHIKI KAISHA TOYOTA CHUO KENKYUSHO, Nagakute-shi, Aichi-ken (JP)

(72) Inventors: Hideto Shimada, Nagakute (JP); Kentaro Mizuno, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 382 days.

(21) Appl. No.: 15/057,271

(22) Filed: Mar. 1, 2016

(65) Prior Publication Data
US 2016/0266552 A1 Sep. 15, 2016

(30) Foreign Application Priority Data
Mar. 13, 2015 (JP) .................................. 2015-050283

(51) Int. Cl.
*G04F 10/00* (2006.01)
*G04F 10/04* (2006.01)
*G01K 7/34* (2006.01)

(52) U.S. Cl.
CPC ............. *G04F 10/04* (2013.01); *G01K 7/346* (2013.01); *G04F 10/005* (2013.01)

(58) Field of Classification Search
CPC ...................................................... G04F 10/005
See application file for complete search history.

(56) References Cited

U.S. PATENT DOCUMENTS

| 5,357,490 A | 10/1994 | Kashine |
| 5,442,669 A * | 8/1995 | Medin ................. G01K 3/04 327/141 |
| 8,531,327 B2 * | 9/2013 | Sohn .................... H03M 1/162 341/155 |
| 2011/0248145 A1 * | 10/2011 | Tanaka ................. H03M 1/144 250/208.1 |

FOREIGN PATENT DOCUMENTS

| JP | H05-34474 A | 2/1993 |
| JP | 2013-185985 A | 9/2013 |

OTHER PUBLICATIONS

Jul. 4, 2017 Office Action issued in Japanese Patent Application No. 2015-050283.

* cited by examiner

*Primary Examiner* — Clayton E Laballe
*Assistant Examiner* — Leon W Rhodes, Jr.
(74) *Attorney, Agent, or Firm* — Oliff PLC

(57) ABSTRACT

A time measuring circuit is provided with an oscillating circuit configured to generate a low-speed clock signal and a high-speed clock signal; and a measuring circuit configured to measure target time based on clock number of the low-speed clock signal and the high-speed clock signal outputted from the oscillating circuit, wherein the low-speed clock signal has a relatively low frequency and the high-speed clock signal has a relatively high frequency. The oscillating circuit is configured to switch from outputting the low-speed clock signal to outputting the high-speed clock signal when elapsed time from when a measurement of the target time started reaches a set value, and the set value is calculated by subtracting a predetermined value from a preliminary value which is provided by a preliminary measurement measuring the target time using only the low-speed clock signal.

4 Claims, 4 Drawing Sheets

TIME MEASURING CIRCUIT AND TEMPERATURE SENSOR CIRCUIT

CROSS-REFERENCE TO RELATED APPLICATION

This application claims priority to Japanese Patent Application No. 2015-050283 filed on Mar. 13, 2015, the entire contents of which are hereby incorporated by reference into the present application.

TECHNICAL FIELD

The technique disclosed herein relates to a time measuring circuit. The technique disclosed herein further relates to a temperature sensor circuit that is provided with the time measuring circuit.

DESCRIPTION OF RELATED ART

A time measuring circuit that measures time by using a clock signal is known. Such a time measuring circuit is in demand in various situations. For example, Japanese Patent Application Publication No. 2013-185985 discloses a temperature sensor circuit provided with this type of time measuring circuit. In the temperature sensor circuit of Japanese Patent Application Publication No. 2013-185985, the time measuring circuit is used to measure delay time of a delay signal having temperature dependency.

In this type of time measuring circuit, time resolution is improved by configuring the clock signal in high frequency. On the other hand, when the clock signal is configured in high frequency, a bit number for a counter needs to be increased, which requires greater amount of circuitry resources. Japanese Patent Application Publication No. H5-34474 discloses a time measuring circuit that uses a low-speed clock signal of a relatively low frequency and a high-speed clock signal of a relatively high frequency. This time measuring circuit is configured to switch from the low-speed clock signal to the high-speed clock signal when time since when measurement of target time has started reaches a set value. Due to this, both the improvement in the time resolution and the suppression of the counter bit number increase are achieved.

BRIEF SUMMARY OF INVENTION

In the time measuring circuit of Japanese Patent Application Publication No. H5-34474, a timing when the switch from the low-speed clock signal to the high-speed clock signal is to take place is calculated by subtracting a predetermined value from an estimated value of the target time to be measured. In such a time measuring circuit, when a change in the target time is large, for example, when the target time becomes prominently longer than the estimated value, time during which the measurement is carried out using the high-speed clock signal becomes long, and an insufficiency in the counter bits may occur. The present description provides a time measuring circuit that can suitably measure time even in cases where a change in target time to be measured is large. Further, the present description in its another aspect provides a temperature sensor circuit provided with such a time measuring circuit.

One aspect of a time measuring circuit disclosed herein comprises an oscillating circuit and a measuring circuit. The oscillating circuit is configured to generate a low-speed clock signal and a high-speed clock signal. The low-speed clock signal has a relatively low frequency and the high-speed clock signal has a relatively high frequency. The measuring circuit is configured to measure target time based on the low-speed clock signal and the high-speed clock signal outputted from the oscillating circuit. The oscillating circuit is configured to switch from outputting the low-speed clock signal to outputting the high-speed clock signal when elapsed time from when a measurement of the target time started reaches a set value. The set value is calculated by subtracting a predetermined value from a preliminary value which is provided by a preliminary measurement measuring the target time using only the low-speed clock signal.

In the above time measuring circuit, the timing to switch from the low-speed clock signal to the high-speed clock signal is calculated by subtracting the predetermined value from the preliminary value that was obtained by the preliminary measurement of the target time that was performed using only the low-speed clock signal. Due to this, even in a case where a change in the target time is large, the time measured using the high-speed clock signal is not changed greatly. Due to this, the risk of insufficiency of counter bits can be resolved. The above time measuring circuit can perform suitable time measurements even in the case where the change in the target time is great.

One aspect of a temperature sensor circuit disclosed herein comprises an oscillating circuit, a delay circuit and a measuring circuit. The oscillating circuit is configured to generate a low-speed clock signal and a high-speed clock signal. The low-speed clock signal has a relatively low frequency and the high-speed clock signal has a relatively high frequency. The delay circuit is configured to generate a delay signal. The delay time of the delay signal has a temperature dependency. The measuring circuit is configured to measure delay time of the delay signal based on the low-speed clock signal and the high-speed clock signal outputted from the oscillating circuit. The oscillating circuit is configured to switch from outputting the low-speed clock signal to outputting the high-speed clock signal when elapsed time from when a measurement of the delay time started reaches a set value. The set value is calculated by subtracting a predetermined value from a preliminary value which is provided by a preliminary measurement measuring the delay time using only the low-speed clock signal.

In the above temperature sensor circuit, the timing to switch from the low-speed clock signal to the high-speed clock signal is calculated by subtracting the predetermined value from the preliminary value that was obtained by the preliminary measurement of the delay time that was performed using only the low-speed clock signal. Temperature changes greatly in accordance with environmental changes, and thus the change in the delay time that is being the target of measurement is also great. Even in such a case, in the above temperature sensor circuit, the time measured using the high-speed clock signal is not changed greatly. Due to this, the risk of insufficiency of counter bits can be resolved. The above temperature sensor circuit can perform suitable delay time measurements and can obtain suitable temperature information even in the case where the change in the temperature is great and thus the change in the delay time is great.

DETAILED DESCRIPTION OF INVENTION

Figure 1:
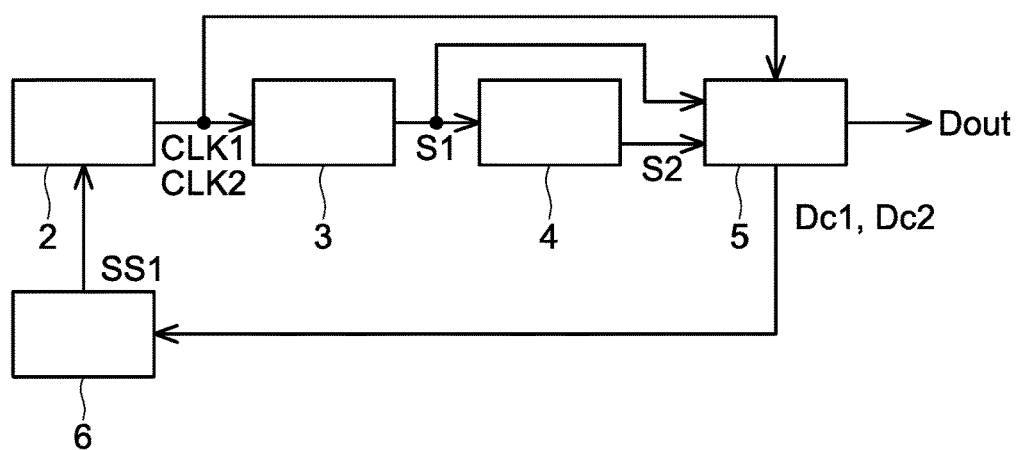
FIG. 1 is a block diagram schematically showing a temperature sensor circuit.

Some of the features characteristic to below-described embodiments will herein be listed. It should be noted that the respective technical elements are independent of one another, and are useful solely or in combinations. The combinations thereof are not limited to those described in the claims as originally filed.

A time measuring circuit disclosed herein may comprise an oscillating circuit and a measuring circuit. The oscillating circuit may generate a low-speed clock signal having a relatively low frequency and a high-speed clock signal having a relatively high frequency. The measuring circuit may measure target time based on clock number of the low-speed clock signal and the high-speed clock signal outputted from the oscillating circuit. Here, the target time may be defined by signals that appear in periodic cycles. Alternatively, the target time may reflect a changing physical phenomenon. The oscillating circuit may be configured to switch from outputting the low-speed clock signal to outputting the high-speed clock signal when elapsed time from when a measurement of the target time started reaches a set value. The set value may be calculated by subtracting a predetermined value from a preliminary value which is provided by a preliminary measurement measuring the target time using only the low-speed clock signal.

A temperature sensor circuit disclosed herein may comprise an oscillating circuit, a delay circuit, and a measuring circuit. The oscillating circuit may generate a low-speed clock signal having a relatively low frequency and a high-speed clock signal having a relatively high frequency. The delay circuit may generate a delay signal of which delay time has temperature dependency. The measuring circuit may measure delay time of the delay signal based on the clock number of the low-speed clock signal and the high-speed clock signal outputted from the oscillating circuit. The oscillating circuit may be configured to switch from outputting the low-speed clock signal to outputting the high-speed clock signal when elapsed time from when a measurement of the delay time started reaches a set value. The set value may be calculated by subtracting a predetermined value from a preliminary value which is provided by a preliminary measurement measuring the delay time using only the low-speed clock signal.

In the above time measuring circuit and temperature sensor circuit, the oscillating circuit may comprise a ring oscillator with a plurality of a bootstrap type CMOS inverters connected in a ring shape. In this case, the above time measuring circuit and temperature sensor circuit have suppressed power consumption.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved time measuring circuit and temperature sensor circuit, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

As shown in FIG. 1, a temperature sensor circuit 1 is a circuit integrated into one chip, and comprises an oscillating circuit 2, a frequency divider circuit 3, a delay circuit 4, a delay time measuring circuit 5, and a switching signal generating circuit 6.

The oscillating circuit 2 is configured to generate a low-speed clock signal CLK1 with a relatively low frequency and a high-speed clock signal CLK2 with a relatively high frequency. These clock signals CLK1, CLK2 are for example rectangular waves with 50% duty ratio. The frequency divider circuit 3 is configured to convert the low-speed clock signal CLK1 to a low-frequency signal S1 having a low frequency. The frequency divider circuit 3 modulates the frequency of the low-speed clock signal CLK1 to a low frequency for example by 1/1024 times or 1/2048 times. The delay circuit 4 is configured to generate a delay signal S2 that is delayed from the low-frequency signal S1. The delay time measuring circuit 5 is configured to calculate a time difference between the low-frequency signal S1 and the delay signal S2 (corresponding to delay time of the delay signal S2) based on clock numbers of the low-speed clock signal CLK1 and the high-speed clock signal CLK2. As will be mentioned later, the delay time measuring circuit 5 is configured to calculate the time difference between the low-frequency signal S1 and the delay signal S2 (corresponding to the delay time of the delay signal S2) by using the clock signal that is selected from the low-speed clock signal CLK1 and the high-speed clock signal CLK2. The delay time measuring circuit 5 is configured to reset a counter value at a rising edge of the low-frequency signal S1 and latch the counter value at a rising edge of the delay signal S2. Further, the delay time measuring circuit 5 is configured to output the measured clock number as a digital temperature information $D_{out}$. The switching signal generating circuit 6 is configured to generate a switching signal SS1 based on the clock number measured by the delay time measuring circuit 5.

Figure 2:
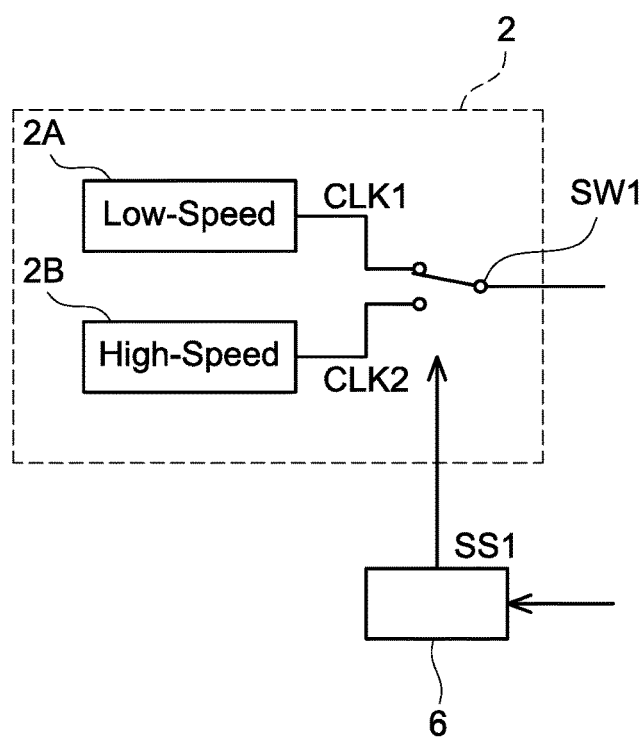
FIG. 2 is a block diagram schematically showing an oscillating circuit.

As shown in FIG. 2, the oscillating circuit 2 comprises a low-speed clock signal generating circuit 2A, a high-speed clock signal generating circuit 2B, and a switch circuit SW1. The low-speed clock signal generating circuit 2A is configured to generate the low-speed clock signal CLK1. The high-speed clock signal generating circuit 2B is configured to generate the high-speed clock signal CLK2. The switch circuit SW1 is configured to select one of the low-speed clock signal generating circuit 2A and the high-speed clock signal generating circuit 2B based on the switching signal SS1 from the switching signal generating circuit 6.

Figure 3:
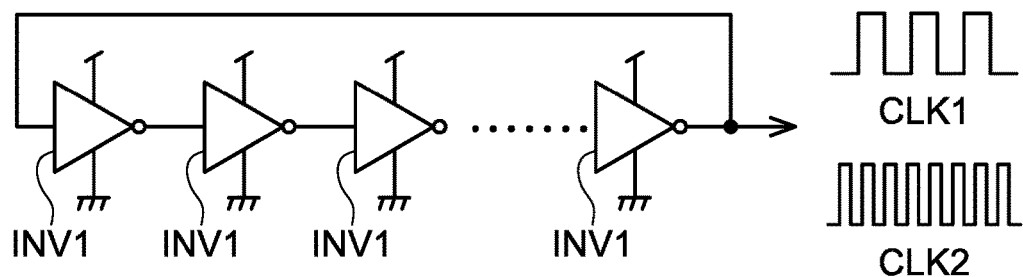
FIG. 3 is a diagram schematically showing a ring oscillator included in the oscillating circuit.

As shown in FIG. 3, each of the low-speed clock signal generating circuit 2A and the high-speed clock signal generating circuit 2B of the oscillating circuit 2 is configured by a ring oscillator in which a plurality of first inverters INV1 is connected in a ring shape. The number of stages of the first inverters INV1 in the low-speed clock signal generating circuit 2A and the high-speed clock signal generating circuit 2B are different from each other, by which frequencies of the clock signals CLK1, CLK2 to be oscillated therein become different. In this embodiment, the number of stages in the low-speed clock signal generating circuit 2A is greater than the number of stages in the high-speed clock signal generating circuit 2B. For example, the low-speed clock signal generating circuit 2A comprises 15 stages of first inverters INV1. The high-speed clock signal generating circuit 2B comprises 3 stages of first inverters INV1.

Figure 4:
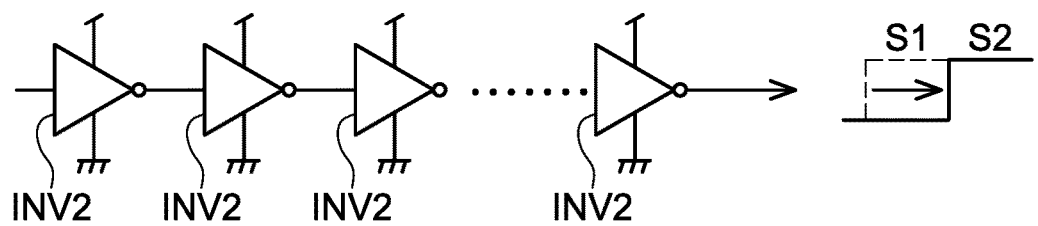
FIG. 4 is a diagram schematically showing an inverter chain included in a delay circuit.

As shown in FIG. 4, the delay circuit 4 is configured of an inverter chain in which a plurality of second inverters INV2 is serially connected. For example, the inverter chain comprises 50 stages of second inverters INV2.

Figure 5:
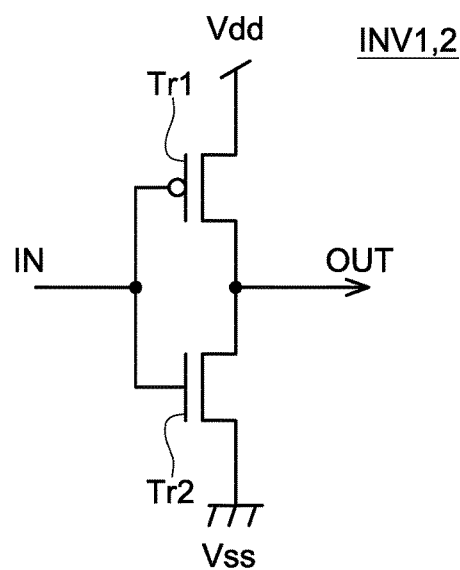
FIG. 5 is a circuitry diagram of a CMOS inverter configuring the ring oscillator and the inverter chain.

As shown in FIG. 5, the first inverters INV1 of the ring oscillator and the second inverters INV2 of the inverter chain are all provided with CMOS that includes a first transistor Tr1 and a second transistor Tr2 connected serially between a positive power line (Vdd line) and a negative power line (Vss). The first transistor Tr1 is a p-type MOSFET (Metal Oxide Semiconductor Field Effect Transistor), having its source connected to the Vdd line and its drain connected to a drain of the second transistor Tr2. The second transistor Tr2 is an n-type MOSFET, having its drain connected to the drain of the first transistor Tr1, and its source connected to the negative power line Vss. A contact point for the first transistor Tr1 and the second transistor Tr2 is connected to a gate of a transistor configuring the CMOS inverter on the subsequent stage.

The temperature sensor circuit 1 is characteristic in that a channel length modulation effect by the transistors Tr1, Tr2 configuring the first inverters INV1 of the ring oscillator is different from a channel length modulation effect by the transistors Tr1, Tr2 configuring the second inverters INV2 of the inverter chain. Specifically, when a gate width is set constant, a gate length of the transistors Tr1, Tr2 configuring the first inverters INV1 of the ring oscillator is configured shorter than a gate length of the transistors Tr1, Tr2 configuring the second inverters INV2 of the inverter chain. Notably, in this embodiment, the gate length of the first transistor Tr1 of the first inverter INV1 is shorter than the gate length of the first transistor Tr1 of the second inverter INV2, and further the gate length of the second transistor Tr2 of the first inverter INV1 is shorter than the gate length of the second transistor Tr2 of the second inverter INV2. Alternative to this example, only one of the gate lengths of the first transistor Tr1 and the second transistor Tr2 of the first inverter INV1 may be short than that of the second inverter INV2.

Normally, operating current becomes smaller and an operation speed slows down for the transistors Tr1, Tr2 in a high temperature than in a low temperature. Due to this, since the operation speed drops in the high temperature than in the low temperature for the first inverters INV1 of the ring oscillator, a cyclic length of the oscillated clock signals CLK1, CLK2 increases (frequencies thereof decrease). That is, the cyclic length of the clock signals CLK1, CLK2 has positive temperature dependency, by which they increase substantially linearly relative to the temperature. Further, in the second inverters INV2 of the inverter chain as well, since their operation speed drops in the high temperature than in the low temperature, so the delay time of the delay signal S2 increases. That is, the delay time of the delay signal S2 also has positive temperature dependency, by which they increase substantially linearly relative to the temperature. Here, the channel length modulation effect refers to an increased amount of current in a saturated region with IV characteristic. Due to this, the channel length modulation effect being different means that the increased amount of current in the saturated region with IV characteristic is different. In the present embodiment, since the gate length of the transistors Tr1, Tr2 configuring the first inverters INV1 of the ring oscillator is shorter than the gate length of the transistors Tr1, Tr2 configuring the second inverters INV2 of the inverter chain, the transistors Tr1, Tr2 configuring the first inverters INV1 of the ring oscillator are greater than the transistors Tr1, Tr2 configuring the second inverters INV2 of the inverter chain in regards to the increased amount of current in the saturated region with IV characteristic. Due to this, when a change from the low temperature to the high temperature takes place, current changing amounts in the transistors Tr1, Tr2 of the ring oscillator become relatively small, and current changing amounts in the transistors Tr1, Tr2 of the inverter chain become relatively large. As a result, when the change from the low temperature to the high temperature takes place, a decreasing amount of the operation speed for the ring oscillator is relatively small and a decreasing amount of the operation speed for the inverter chain becomes relatively large.

In the temperature sensor circuit 1, the channel length modulation effect of the transistors Tr1, Tr2 configuring the first inverters INV1 of the ring oscillator and the channel length modulation effect of the transistors Tr1, Tr2 configuring the second inverters INV2 configuring the inverter chain are different, and due to this, in the present embodiment, the decreasing amount of the operation speed of the ring oscillator and the decreasing amount of the operation speed of the inverter chain are caused different thereby when the change from the low temperature to the high temperature takes place, so the temperature dependency of the clock signals CLK1, CLK2 generated in the ring oscillator and the temperature dependency of the delay signal S2 generated in the inverter chain are caused to be different. As described above, the cyclic length of the clock signals CLK1, CLK2 has the positive temperature dependency of increasing substantially linearly relative to the temperature. The delay time of the delay signal S2 also has the positive temperature dependency of increasing substantially linearly relative to the temperature. Moreover, there is a relationship that a changing rate of the delay time of delay signal S2 relative to the temperature (ratio of the delay time at an arbitrary temperature when the delay time at a reference temperature is denoted as "1") is greater than a changing rate of the cyclic length of the clock signals CLK1, CLK2 relative to the temperature (ratio of the cyclic length at an arbitrary temperature when the cyclic length at the reference temperature is denoted as "1"), so the temperature dependencies thereof differ from each other.

As above, when the temperature dependency of the clock signals CLK1, CLK2 generated in the ring oscillator and the temperature dependency of the delay signal S2 generated in the inverter chain are different, the clock number measured by the delay time measuring circuit 5 changes relative to the temperature. In the temperature sensor circuit 1, the difference existing between the temperature dependency of the clock signals CLK1, CLK2 and the temperature dependency of the delay signal S2 is used to obtain the temperature information $D_{out}$.

Figure 6:
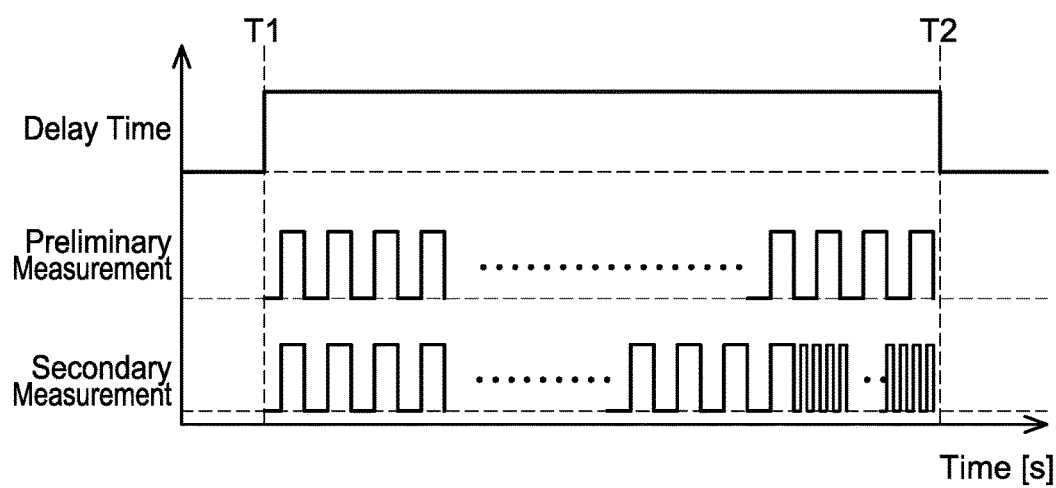
FIG. 6 is a timing chart showing how a temperature sensor circuit operates.

FIG. 6 shows how the temperature sensor circuit 1 measures the delay time. In this embodiment, time from a timing T1 to a timing T2 corresponds to the delay time. The timing T1 corresponds to the rising edge of the low-frequency signal S1, and the timing T2 corresponds to the rising edge of the delay signal S2 (see FIG. 1 and FIG. 4).

The temperature sensor circuit 1 characteristically performs a preliminary measurement and a secondary measurement. In the preliminary measurement, the delay time is measured by using only the low-speed clock signal CLK1. In the secondary measurement, the delay time is measured by using both the low-speed clock signal CLK1 and the high-speed clock signal CLK2. In the secondary measurement, a timing to switch from the low-speed clock signal CLK1 to the high-speed clock signal CLK2 takes place when the time since the measurement of the delay time has started reached a set value. Specifically, the timing to switch from the low-speed clock signal CLK1 to the high-speed clock signal CLK2 takes place when the clock number of the low-speed clock signal CLK1 since when the delay time measurement has started reaches the set number. This set number is calculated by subtracting a predetermined clock number from the clock number of the low-speed clock signal CLK1 measured in the preliminary measurement.

Figure 7:
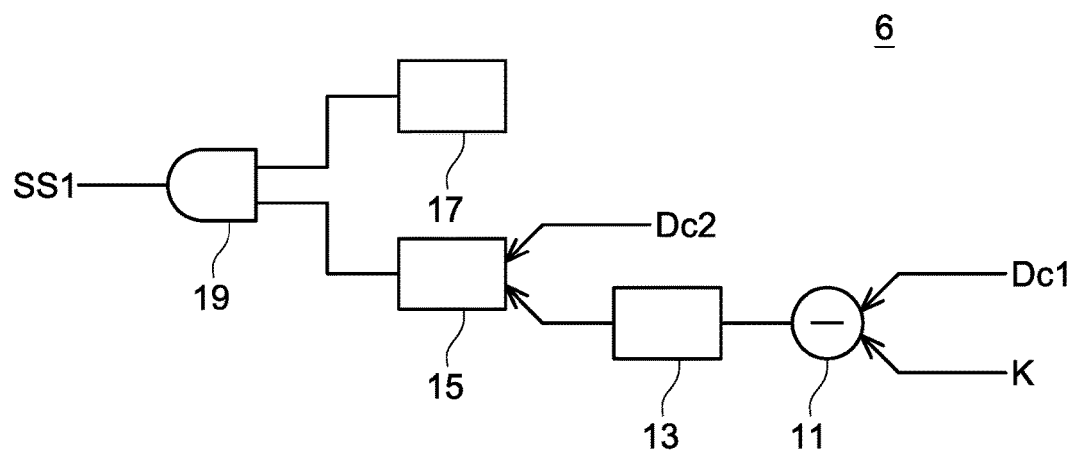
FIG. 7 is a diagram schematically showing a switching signal generating circuit.

The timing to switch from the low-speed clock signal CLK1 to the high-speed clock signal CLK2 is controlled by the switching signal generating circuit 6 (see FIG. 1). As shown in FIG. 7, the switching signal generating circuit 6 comprises a subtractor circuit 11, a register 13, a comparator circuit 15, a measured number recording circuit 17 and an AND circuit 19.

Dc1 is a digital count value outputted from the delay time measuring circuit 5, and corresponds to the clock number of the low-speed clock signal CLK1 measured in the preliminary measurement. K is a digital predetermined value that is set in advance. The predetermined value K may be a fix value, or may be a value that can be changed as needed. The subtractor circuit 11 calculates a value (Dc1-K) in which the predetermined value K is subtracted from the counter value Dc1. The value (Dc1-K) is the set number that determines the timing to switch from the low-speed clock signal CLK1 to the high-speed clock signal. CLK2 in the secondary measurement. The register 13 stores the set number (Dc1-K).

Dc2 is a digital count value outputted from the delay time measuring circuit 5, and corresponds to the clock number of the low-speed clock signal CLK1 measured in the secondary measurement. The comparator circuit 15 switches its output from low to high when the counter value Dc2 exceeds the set number (Dc1-K). The measured number recording circuit 17 is a 1-bit memory, and outputs low during the preliminary measurement and outputs high during the secondary measurement. The AND circuit 19 outputs the switching signal SS1 when the count value Dc2 exceeds the set number (Dc1-K) during the secondary measurement, that is, when the clock number of the low-speed clock signal CLK1 since when the delay time measurement in the secondary measurement was started reaches the set number (Dc1-K).

As shown in FIGS. 1 and 2, when the switching signal SS1 is inputted, the oscillating circuit 2 changes a connection destination of the switch SW1 from the low-speed clock signal generating circuit 2A to the high-speed clock signal generating circuit 2B, and switches the clock signal to be provided to the delay time measuring circuit 5 from the low-speed clock signal CLK1 to the high-speed clock signal CLK2. As above, the switching signal generating circuit 6 can control the timing to switch from the low-speed clock signal CLK1 to the high-speed clock signal CLK2 in the secondary measurement.

The delay time measuring circuit 5 of the temperature sensor circuit 1 provides the set value (Dc1-K) and the counter value by the high-speed clock signal CLK2 as the temperature information $D_{out}$. The counter value by the high-speed clock signal CLK2 is obtained by resetting the counter value of the delay time measuring circuit 5 while synching with the switching signal SS1 of the switching signal generating circuit 6 in the secondary measurement. As above, the temperature sensor circuit 1 can output the count number measured by using the low-speed clock signal CLK1 and the count number measured by using the high-speed clock signal CLK2 in the secondary measurement as the temperature information $D_{out}$.

In the temperature sensor circuit 1, the time of measurement using the high-speed clock signal CLK2 is fixed based on the predetermined value K. For example, the temperature which the temperature sensor circuit 1 aims to measure changes greatly accompanying environmental changes, and due to this, the changes in the delay time to be measured are also great. For example, even if the delay time is elongated with the temperature rise, the time for the measurement using the high-speed clock signal does not change greatly in the temperature sensor circuit 1. Due to this, the risk of insufficient bits in the counter of the delay time measuring circuit 5 can be resolved. Even in cases where the changes in the delay time to be measured are great, the temperature sensor circuit 1 can suitably measure the delay time, so the temperature information $D_{out}$ can be obtained suitably.

As shown in FIG. 2, the oscillating circuit 2 of the temperature sensor circuit 1 switches the clock signal to be supplied to the delay time measuring circuit 5 from the low-speed clock signal CLK1 to the high-speed clock signal CLK2 by changing the connection destination of the switch circuit SW1 from the low-speed clock signal generating circuit 2A to the high-speed clock signal generating circuit 2B. As an alternative to this, the ring oscillator of the oscillating circuit 2 may be configured of a bootstrap type of CMOS inverter.

Figure 8:
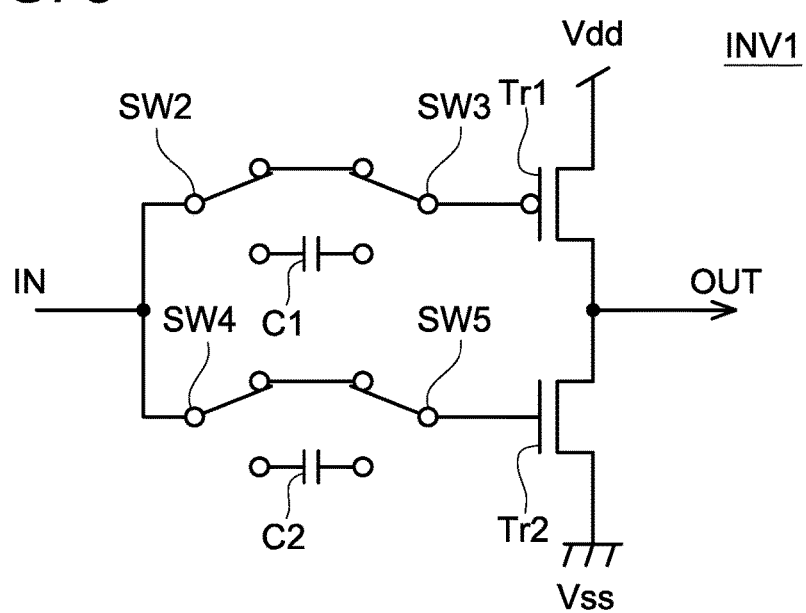
FIG. 8 is a circuitry diagram of a bootstrap type CMOS inverter configuring a ring oscillator.

As shown in FIG. 8, the first inverter INV1 being a bootstrap type of CMOS inverter comprises a plurality of switch circuits SW2, SW3, SW4, SW5 and a plurality of capacitors C1, C2 as compared to the example in FIG. 5. The switch circuits SW2, SW3 are configured to switch between a state of not having the capacitor C1 connected to a gate of the first transistor Tr1 and a state of having the same connected thereto. The switch circuits SW4, SW5 are configured to switch between a state of not having the capacitor C2 connected to a gate of the second transistor Tr2 and a state of having the same connected thereto.

In this type of bootstrapped first inverter INV1, the bootstrap becomes effective when the switching signal SS1 of the switching signal generating circuit 6 is inputted, where the switch circuits SW2, SW3 connect the capacitor C1 to the gate of the first transistor Tr1 and the switch circuits SW4, SW5 connect the capacitor C2 to the gate of the second transistor Tr2. The capacitor C1 is precharged with charges that cause the gate side of the first transistor Tr1 to become negative, as a result of which the first transistor Tr1 is enabled of a high-speed operation. The capacitor C2 is precharged with charges that cause the gate side of the second transistor Tr2 to become positive, as a result of which the second transistor Tr2 is enabled of a high-speed operation.

As above, when the bootstrapped first inverters INV1 are employed for the ring oscillator of the oscillating circuit 2 of the temperature sensor circuit 1, the low-speed clock signal generating circuit 2A and the high-speed clock signal generating circuit 2B do not need to be provided separately as in the example of FIG. 5, so a circuit resource consumption can be suppressed. Further, since the high-speed clock signal CLK2 can be generated only when it is needed, so power consumption can be suppressed low.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A time measuring circuit comprising:
   an oscillating circuit configured to generate a low-speed clock signal and a high-speed clock signal; and
   a measuring circuit configured to measure target time based on clock number of the low-speed clock signal and the high-speed clock signal outputted from the oscillating circuit,
   wherein the low-speed clock signal has a relatively low frequency and the high-speed clock signal has a relatively high frequency,
   the oscillating circuit is configured to switch from outputting the low-speed clock signal to outputting the high-speed clock signal when elapsed time from when a measurement of the target time started reaches a set value, and
   the set value is calculated by subtracting a predetermined value from a preliminary value which is provided by a preliminary measurement measuring the target time using only the low-speed clock signal.

2. The time measuring circuit according to claim 1, wherein
   the oscillating circuit comprises a ring oscillator with a plurality of a bootstrap type CMOS inverters connected in a ring shape.

3. A temperature sensor circuit comprising:
   an oscillating circuit configured to generate a low-speed clock signal and a high-speed clock signal;
   a delay circuit configured to generate a delay signal; and
   a measuring circuit configured to measure delay time of the delay signal based on clock number of the low-speed clock signal and the high-speed clock signal outputted from the oscillating circuit;
   wherein the low-speed clock signal has a relatively low frequency and the high-speed clock signal has a relatively high frequency,
   the delay time of the delay signal has a temperature dependency,
   the oscillating circuit is configured to switch from outputting the low-speed clock signal to outputting the high-speed clock signal when elapsed time from when a measurement of the delay time started reaches a set value, and
   the set value is calculated by subtracting a predetermined value from a preliminary value which is provided by a preliminary measurement measuring the delay time using only the low-speed clock signal.

4. The temperature sensor circuit according to claim 3, wherein
   the oscillating circuit comprises a ring oscillator with a plurality of a bootstrap type CMOS inverters connected in a ring shape.

* * * * *